Nov. 26, 1963  A. T. BIERNATZKI ETAL  3,112,381
STEERING WHEEL MOUNTING
Filed June 21, 1960
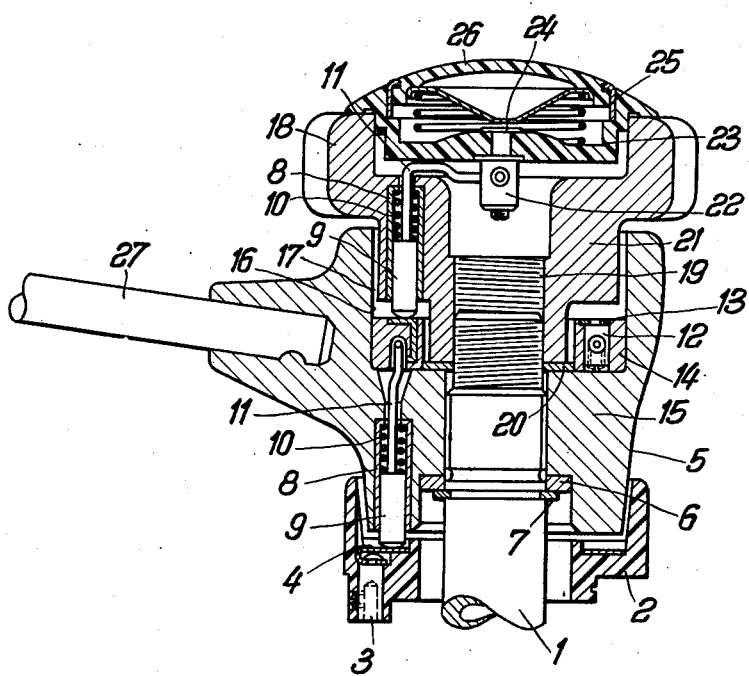
Inventors
A. T. Biernatzki and F. König
by Richards & Geier
ATTORNEYS

United States Patent Office 3,112,381
Patented Nov. 26, 1963

3,112,381
STEERING WHEEL MOUNTING
Anton T. Biernatzki and Friedrich König, Ingolstadt, Germany, assignors to Auto Union G.m.b.H., Ingolstadt, Germany
Filed June 21, 1960, Ser. No. 37,612
Claims priority, application Germany July 3, 1959
4 Claims. (Cl. 200—61.55)

The present invention relates to a steering wheel mounting which permits the steering wheel hub to be easily removed from the steering column tube. Hitherto it has been the usual practice to secure the steering wheel hub to the steering column tube by means of a hexagon nut. The steering wheel hub carries in a cylindrical guide a spring-loaded pin which by means of a cable is connected to a contact piece fastened to the steering column tube. The horn button is held in a carrier ring by means of a retaining spring, and at the same time closes the recess which accommodates the nut serving to secure the steering wheel hub to the steering column tube, as well as the electric current supply cable. When taking off such a steering wheel, respectively such a steering wheel hub, much time is lost by removing the horn button carrier, the electric cable, and the hexagon nut for the loosening of which a wrench of appropriate size is required.

The invention provides a quickly detachable steering wheel mounting by securing the steering wheel hub on the steering column tube by means of a grip nut which carries the horn button and comprises a profiled gripping portion. The use of a grip nut makes a wrench superfluous and eliminates the time-consuming search for such a tool, respectively the opening and closing of a tool bag and of the luggage compartment or another receptacle, where such tools are normally carried. The fact that the horn button is nevertheless to be found in the usual place, saves the driver the inconvenience of getting used to a positon of the horn button which is less convenient to him.

According to a further feature of the invention, a contact ring is secured in a supporting ring between the grip nut and the steering wheel hub. This makes it possible to remove the steering wheel from the steering column tube without having to disconnect any cables, which also results in a considerable saving of time and work.

Further according to the invention, like contact pins, guide sleeves and springs are used in the steering wheel hub and in the grip nut, whereby production, as well as spare parts inventory and storage, are greatly simplified.

Finally, another advantageous feature of the present invention resides in the fact that the supporting ring is arranged in a recess of the steering wheel hub, and below the shoulder portion of the grip nut. In this manner, the supporting ring is secured in a simple manner and is protected against damage when the steering wheel is removed. This is important when the vehicle is to be loaded for transport, and also in cases where there is danger of the vehicle tilting or overturning, as for example with cross-country vehicles. The arrangement according to the invention assures that the serviceability of the vehicle is not impaired in such cases, respectively, that only a very short minimum time is required for making the vehicle again fit for operation.

Other features and advantages of the present invention will become apparent from the following description when taken in conjunction with the accompanying drawing in which a preferred embodiment is shown by way of example only.

The single FIGURE of the drawing shows in section a steering wheel mounting constructed in accordance with the principles of the present invention.

As shown in the drawing, the steering column tube 1 is surrounded by the steering column (not shown) on the upper end of which is fastened a supporting ring 2 which consists of insulating material. Secured in the supporting ring 2 is a terminal 3 for connecting the horn cable. A contact ring 4 is connected to terminal 3 and guided in the supporting ring 2. The steering wheel hub 5 is axially located on the steering column shaft 1 by means of a steel washer 6 and a retaining ring 7. Guide sleeves 8 for contact pins 9 which are acted upon by springs 10, are mounted in the steering wheel hub 5 in a manner known per se. The contact pin 9 is connected through a cable 11 and terminals 12 with a contact ring 13 which is secured in a supporting ring 14. This supporting ring 14 preferably consists of elastic material, e.g. rubber, is axially located by a shoulder 15 of the steering wheel hub 5, and is inserted with press fit into a cylindrical recess 17 of the steering wheel hub. Since the supporting ring 14 is thus in tight frictional engagement with the interior wall 16 of the recess 17, it cannot come loose and fall out of the latter, even when the steering wheel is removed from the steering column. A grip nut 18 is screwed onto the steering column tube 1 by means of a thread 19, and bears against a shoulder 15 of the steering wheel hub 5 through the intermediary of a spring washer 20 which is secured against getting lost by clamping it in the supporting ring 14. Thereby, the steering wheel hub 5 is secured to the steering column 1 in a readily detachable manner. In a shoulder portion 21 of the grip nut 18 there is again provided a guide sleeve 8 with a contact pin 9 which is pressed against the contact ring 13 by a spring 10. The contact pin 9 is connected, in known manner, by a cable 11 to a terminal 22 which is mounted in a supporting ring 23 and carries a contact plate 24. The cable 11 extends into an annular recess in the supporting ring 14, is bent through approximately 90° before reaching the bottom of this annular recess and then passes, in a plane approximately at right angles to the axis of the supporting ring 14, through an arc of 180° to the terminal 12. This arrangement presents the advantage that the cable 11 is not sharply bent or damaged, or its insulation chafed, even when the contact pin 9 is in its fully raised position, because there is sufficient clearance, and hence freedom of movement, between the bent-off portion of cable 11 and the bottom of the annular recess. A horn button 26 is mounted in the carrier ring 23 in such a manner that it is capable of axial movement in a guide ring 25. Thus, the electric circuit for actuating the horn can be closed by depressing the horn button 26, whilst on the other hand the steering wheel hub 5 in which spokes 27 are mounted in a well-known manner, can be easily removed after undoing the grip nut 18.

We claim:
1. A steering wheel mounting, comprising a steering column tube, a steering wheel hub enclosing said steering column tube, a profiled grip nut threaded upon said steering column tube, a spring washer carried by said steering wheel hub and engaged by said grip nut, similar guide sleeves carried by said steering wheel hub and said grip nut, contact pins in said guide sleeves, springs engaging said contact pins, a horn button upon said grip nut, a terminal connected with said horn button, a contact plate carried by said terminal, and means conductively connecting said contact pins with said terminal, said contact plate being energized when said horn button is depressed.

2. A steering wheel mounting, comprising a steering column tube, a steering wheel hub, a retaining ring carried by said steering column tube, a steel washer carried by said retaining ring and engaging a recess formed in said steering wheel hub, a profiled grip nut threaded upon said steering column tube, a spring washer carried by said steering wheel hub and engaged by said grip nut, similar guide sleeves carried by said steering wheel hub and said grip nut, contact pins in said guide sleeves, springs engaging said contact pins, a horn button upon said grip nut, a terminal connected with said horn button, a contact plate carried by said terminal, and means conductively connecting said contact pins with said terminal, said contact plate being energized when said horn button is depressed.

3. A steering wheel mounting, comprising a steering column tube, a steering wheel hub enclosing said steering column tube, a profiled grip nut threaded upon said steering column tube, an elastic supporting ring axially mounted in a cylindrical recess formed in said steering wheel hub, a spring washer engaging said supporting ring and engaged by said grip nut, similar guide sleeves carried by said steering wheel hub and said grip nut, contact pins in said guide sleeves, springs engaging said contact pins, a horn button upon said grip nut, a terminal connected with said horn button, a contact plate carried by said terminal, means operatively connecting said contact pins with said supporting ring, and means conductively connecting said contact pins with said terminal, said contact plate being energized when said horn button is depressed.

4. The steering wheel mounting as claimed in claim 3 wherein the last-mentioned means comprise a cable connected to the contact pin in said steering wheel, and another terminal in said supporting ring adapted to be conductively engaged by the contact pin in said grip nut, said cable extending through approximately 180° in an annular recess formed in said supporting ring, until said other terminal.

References Cited in the file of this patent
UNITED STATES PATENTS

| | | |
|---|---|---|
| 1,248,469 | Egelhofer | Dec. 4, 1917 |
| 2,065,611 | Pulleyblank | Dec. 29, 1936 |
| 2,221,409 | Phelps et al. | Nov. 12, 1940 |
| 2,894,090 | Timoff et al. | July 7, 1959 |